United States Patent
Lee et al.

(10) Patent No.: US 9,201,554 B2
(45) Date of Patent: Dec. 1, 2015

(54) TOUCH SENSING APPARATUS AND METHOD OF DRIVING THE SAME

(71) Applicant: LG DISPLAY CO., LTD., Seoul (KR)

(72) Inventors: Byoung-Gwan Lee, Paju-si (KR);
Myung-Ho Shin, Paju-si (KR);
Dong-Kyun Lim, Goyang-si (KR);
Young-Gyu Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/314,817

(22) Filed: Jun. 25, 2014

(65) Prior Publication Data
US 2015/0002458 A1    Jan. 1, 2015

(30) Foreign Application Priority Data
Jun. 26, 2013    (KR) .................. 10-2013-0073705

(51) Int. Cl.
*G06F 3/044* (2006.01)
*G06F 3/045* (2006.01)
*G06F 3/041* (2006.01)

(52) U.S. Cl.
CPC ............... *G06F 3/044* (2013.01); *G06F 3/045* (2013.01); *G06F 3/0418* (2013.01); *G06F 2203/04107* (2013.01)

(58) Field of Classification Search
CPC ....... G06F 3/044; G06F 3/045; G06F 3/0418; G06F 2203/04107
USPC .................................................. 345/173, 174
See application file for complete search history.

(56) References Cited

U.S. PATENT DOCUMENTS

| | | | |
|---|---|---|---|
| 2008/0278451 A1* | 11/2008 | Lee ............................... | 345/173 |
| 2010/0194695 A1* | 8/2010 | Hotelling et al. ............. | 345/173 |
| 2011/0169770 A1* | 7/2011 | Mishina et al. ............... | 345/174 |
| 2011/0279410 A1* | 11/2011 | Han et al. ...................... | 345/174 |
| 2011/0316803 A1* | 12/2011 | Kim ............................... | 345/173 |
| 2013/0043081 A1* | 2/2013 | Chen .......................... | 178/18.05 |
| 2013/0240341 A1* | 9/2013 | Lo et al. ......................... | 200/600 |
| 2015/0054782 A1* | 2/2015 | Liu ................................ | 345/174 |
| 2015/0116261 A1* | 4/2015 | Ahn .............................. | 345/174 |

\* cited by examiner

*Primary Examiner* — Dmitriy Bolotin
(74) *Attorney, Agent, or Firm* — Birch, Stewart, Kolasch & Birch, LLP

(57) ABSTRACT

A touch sensing apparatus includes a touch sensor and a touch controller for sensing whether touch is present from a readout signal of the touch sensor as well as driving the touch sensor, wherein the touch sensor includes a plurality of scan channels including a plurality of first sensing electrodes arranged in a first direction in a sensing area, a plurality of readout channels including a plurality of second sensing electrodes arranged in a second direction that crosses the first direction in the sensing area, a ground routing line formed to surround the sensing area in a bezel area surrounding the sensing area, a dummy routing line formed between the ground routing line and an outermost readout channel among the plural readout channels in the bezel region, wherein a signal with the same phase as the outermost readout channel is supplied to the dummy routing line.

13 Claims, 7 Drawing Sheets

RELATED ART

FIG. 5B

TOUCH SENSING APPARATUS AND METHOD OF DRIVING THE SAME

This application claims the benefit of Korean Patent Application No. 10-2013-0073705, filed on Jun. 26, 2013, which is hereby incorporated by reference as if fully set forth herein.

BACKGROUND OF THE INVENTION

1. Field of the Invention

The present invention relates to a touch sensing apparatus, and more particularly, to a touch sensing apparatus and a method of driving the same, for reducing the width of a bezel area while reducing noise of an outermost readout channel.

2. Discussion of the Related Art

Today, a touch sensor that can input information via touch on screens of various display apparatuses has been widely used as an information input apparatus of a computer system. The touch sensor moves or selects displayed information by simply touching a screen via a user finger or a stylus and thus can be easily used regardless of age or sex.

A touch sensing apparatus detects a touch and a touch location on a touch sensor of a display apparatus and outputs touch information, and a computer system analyzes the touch information and executes a command. The display apparatus may mainly use a flat display apparatus such as a liquid crystal display apparatus, a plasma display panel, an organic light emitting diode display apparatus, etc. The touch sensor technologies include a resistance layer method, a capacitive method, an optical method, an infrared type method, an ultrasonic method, an electromagnetic method, etc. according to sensing principles.

A touch sensor may be configured as an on-cell touch sensor that is manufactured in a panel form and is attached onto a display apparatus or may be configured as an in-cell sensor installed in a pixel matrix of a display apparatus. The touch sensor mainly uses a photo touch sensor that recognizes a touch according to variation in light intensity using a photo transistor and a capacitive touch sensor that recognizes a touch according to capacitive variation.

In general, a capacitive touch sensing apparatus includes a touch sensor and a touch controller for driving the touch sensor and sensing capacitance that varies according to touch from the touch sensor to calculate touch coordinates.

A conventional touch sensing apparatus further includes a ground routing line formed on a bezel area corresponding to an edge portion of the touch sensor and connected to a ground in order to prevent electro-magnetic interference (EMI) due to static electricity introduced outside the touch sensing apparatus.

However, as a ground line formed on a bezel area of a touch sensor is located close to an outermost readout channel adjacent to the ground line, parasitic capacitance formed between a ground routing line and an outermost readout channel is increased, thereby increasing parasitic capacitance deviation between outer readout channels positioned on an outer portion. Problems arise in that the noise component of the outermost readout channel is increased in proportion to this parasitic capacitance deviation, thereby reducing the sensing capability of the outermost readout channel.

In order to address these problems, an interval between a ground routing line and an outermost readout channel is increased. In this case, problems arise in that parasitic capacitance variation and noise component due thereto is reduced, whereas the width of an outer bezel area is increased.

SUMMARY OF THE INVENTION

Accordingly, the present invention is directed to a touch sensing apparatus and a method of driving the same that substantially obviates one or more problems due to limitations and disadvantages of the related art.

An object of the present invention is to provide a touch sensing apparatus and a method of driving the same, for reducing the width of a bezel area while reducing noise of an outermost readout channel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch sensing apparatus includes a plurality of readout channels arranged next to each other, each readout channel comprising at least one sensor electrode; a ground routing line arranged next to at least one outermost readout channel of the plurality of readout channels; at least one dummy routing line arranged between the ground routing line and the at least one outermost readout channel; and a touch controller configured to provide a signal through the dummy routing line to at least reduce a noise caused by the at least one outermost readout channel.

The dummy routing line runs at least partially in parallel to the at least one outermost readout channel. The at least one dummy routing line comprises a first dummy routing line and a second dummy routing line. The at least one outermost readout channel comprises a first outermost readout channel arranged on a first side of the plurality of readout channels and a second outermost readout channel arranged on a second side of the plurality of readout channels, wherein the second side is opposite the first side, The first dummy routing line is arranged between the ground routing line and the first outermost readout channel. The second dummy routing line is arranged between the ground routing line and the second outermost readout channel.

The touch controller is configured to provide the signal through the dummy routing line, wherein the signal has the same phase as a readout signal of the outermost readout channel. The touch controller comprises a buffer circuit configured to provide the signal.

The buffer circuit includes at least one amplifier. A non-inverting input of the amplifier is coupled to the outermost readout channel. An inverting input of the amplifier and an output of the amplifier are coupled to the dummy routing line.

The touch controller further includes a plurality of differential amplifiers, each differential amplifier comprising two inputs. Each of two adjacent readout channels of the plurality of readout channels is coupled to a respective input of the two inputs of an associated differential amplifier.

The touch sensing apparatus further includes a sensing region, wherein the plurality of readout channels are arranged within the sensing region; and a bezel region at least partially surrounding the sensing region, wherein the ground routing line and the at least one dummy routing line are arranged within the bezel region.

The touch sensing apparatus further includes a plurality of scan channels arranged next to each other, each scan channel comprising at least one sensor electrode. The scan channels are arranged in a first direction. The readout channels are arranged in a second direction perpendicular to the first direction. At least one sensor electrode of a scan channel and an associated at least one sensor electrode of a readout channel form a capacitance according to a fringe field.

The touch controller is configured to provide a signal through the dummy routing line to at least reduce the parasitic capacitance deviation between the at least one outermost readout channel and other readout channels and/or to at least reduce the parasitic capacitance between the at least one outermost readout channel and the ground routing line.

In another aspect of the present invention, a method of driving a touch sensing apparatus includes supplying a signal through the dummy routing line to at least reduce a noise caused by the at least one outermost readout channel. The signal has the same phase as a readout signal of the outermost readout channel.

The method further includes buffering a readout signal of the outermost readout channel; and supplying the signal based on the buffered readout signal of the outermost readout channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
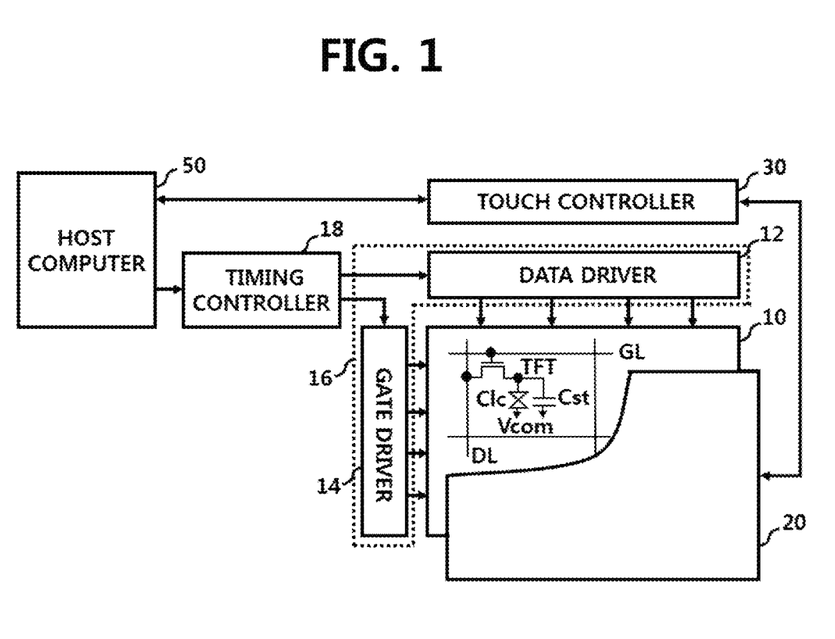
FIG. 1 is a schematic block diagram illustrating a structure of a display apparatus including a touch sensing apparatus according to an embodiment of the present invention.

FIG. 1 is a block diagram illustrating a structure of a display apparatus including a touch sensing apparatus according to an embodiment of the present invention.

The display apparatus including the touch sensing apparatus illustrated in FIG. 1 includes a display panel 10, a panel driver 16 including a data driver 12 and a gate driver 14 for displaying the display panel 10, a timing controller 18 for controlling the panel driver 16, a touch sensor 20 on the display panel 10, and a touch controller 30 for driving the touch sensor 20. The timing controller 18 and the touch controller 30 are connected to a host computer 50. All components of the display apparatus are operatively coupled and configured.

The timing controller 18 and the data driver 12 may be integrated as respective integrated circuits (ICs) or the timing controller 18 may be installed in the data driver 12 to be integrated as one IC. The touch controller 30 and the timing controller 18 may also be integrated as respective ICs or the touch controller 30 may be installed in the timing controller 18 to be integrated as one IC.

The display panel 10 includes a pixel matrix in which a plurality of pixels is arranged. The pixel matrix displays a graphic user interface (GUI) including a pointer or a cursor and other images. The display panel 10 may be a flat display panel such as a liquid crystal display panel (hereinafter, liquid crystal panel), a plasma display pane, and an organic light emitting diode display panel. Hereinafter, a detailed description will be given in terms of a liquid crystal panel.

When a liquid crystal panel is used as the display panel 10, the display panel 10 includes a color filter substrate on which a color filter array is formed, a thin film transistor substrate on which a thin film transistor array is formed, a liquid crystal layer between the color substrate and the thin film transistor substrate, and polarization plates attached to respective external surfaces of the color filter substrate and the thin film transistor substrate. The display panel 10 displays an image through the pixel matrix on which the plural pixels are arranged. Each pixel may embody desired color via a combination of red, green, and blue sub-pixels for adjusting light transmittance by changing arrangement of liquid crystal according to a data signal and may further include a white sub-pixel in order to improve brightness. Each sub-pixel includes a thin film transistor TFT connected to a gate line GL and a data line DL, and a liquid crystal capacitor Clc and a storage capacitor Cst that are connected in parallel to the thin film transistor TFT. The liquid crystal capacitor Clc is charged with a differential voltage between a data signal (e.g., a data current) supplied to a pixel electrode through the thin film transistor TFT and a common voltage Vcom supplied to a common electrode and drives liquid crystal according to the charged voltage to adjust light transmittance. The storage capacitor Cst maintained the voltage charged in the liquid crystal capacitor Clc. The liquid crystal layer is driven via a vertical electric field like in a twisted nematic (TN) mode or a vertical alignment (VA) mode or is driven via a horizontal electric field like in an in-plane switching (IPS) mode or a fringe field switching (FFS) mode.

The data driver 12 supplies image data from the timing controller 18 to a plurality of data lines DL of the display panel 10 in response to a data control signal from the timing controller 18. The data driver 12 converts digital data input from the timing controller 18 into positive/negative analog data signals using gamma voltages, and supplies the analog data signals to the data lines DL respectively whenever each gate line GL is driven. The data driver 12 may include at least one data IC. The data driver 12 may be mounted on a circuit film such as a tape carrier package (TCP), a chip on film (COF), a flexible print circuit (FPC), etc. and may be attached to the display panel 10 using a tape automatic bonding (TAB) scheme or may be mounted on the display panel 10 using a chip on glass (COG) scheme.

The gate driver 14 sequentially drives a plurality of gate lines GLs formed on a thin film transistor array of the display panel 10 in response to a gate control signal from the timing controller 18. The gate driver 14 supplies a scan pulse of a gate-on voltage every corresponding scan period of each gate line GL and supplies a gate-off voltage in the remaining period in which another gate line GL is driven. The gate driver 14 may include at least one gate IC. The gate driver 14 may be mounted on a circuit film such as a tape carrier package (TCP), a chip on film (COF), a flexible print circuit (FPC), etc. and may be attached to the display panel 10 using a tape automatic bonding (TAB) scheme or may be mounted on the display panel 10 using a chip on glass (COG) scheme. On the other hand, the gate driver 14 may be installed in the display panel 10 using a gate in panel (GIP) scheme and thus may be formed on the thin film transistor substrate together with the pixel array.

The timing controller 18 signal-processes image data input from the host computer 50 and supplies the image data to the data driver 12. For example, in order to enhance a response speed of liquid crystal, the timing controller 18 may correct and output data by an overdriving method for adding an overshoot value or an undershoot value according to a data difference per a subpixel between adjacent frames. In addition, the timing controller 18 generates a data control signal for controlling driving timing of the data driver 12 and a gate control signal for controlling driving timing of the gate driver 14 using at least two of a plurality of synchronization signals, that is, a vertical synchronization signal, a horizontal synchronization signal, a data enable signal, and a dot clock, input from the host computer 50. The timing controller 18 outputs the generated data control signal and gate control signal to the data driver 12 and the gate driver 14, respectively. The data control signal includes a source start pulse and source sampling clock for controlling latch of a data signal, a polarity control signal for controlling a data signal, a source output enable signal for controlling an output period of a data signal, etc. The gate control signal includes a gate start pulse and gate shift clock for controlling scanning of a gate signal, a gate output enable signal for controlling an output period of a gate signal, etc. The timing controller 18 may supply a synchronization signal (a vertical synchronization signal, a horizontal synchronization signal, etc.) to the touch controller 30 and control driving timing of the touch controller 30 such that driving timing of the display panel 10 is synchronized with driving timing of the touch sensor 20.

The touch sensor 20 may sense user touch to allow a user to have a conversation with the GUI displayed on the display panel 10. The touch sensor 20 may mainly use a capacitive type touch sensor. When a conductor such as a human body or a stylus touches or approaches the capacitive type touch sensor, a small amount of electric charges move to the touched point to induce capacitance variation. The capacitive type touch sensor indicates the capacitance variation through a readout signal (e.g., a readout current or readout voltage). The touch sensor 20 may be attached onto the display panel 10 or may be mounted in the pixel matrix of the display panel 10.

In particular, the touch sensor 20 further includes a dummy routing line formed on a bezel area to be adjacent to the outermost readout channel. The bezel area may further include a dummy routing line. The touch sensor 20 applies a signal (e.g., a current or voltage) with the same phase as a readout signal of the outermost readout channel so as to minimize parasitic capacitance deviation between the outermost readout channel and adjacent readout channels, thereby minimizing noise component of the outermost readout channel (or with a small phase shift which still provides for a (e.g., dynamic) shielding to thereby at least reduce the noise between the outermost readout channel and the ground routing line). In addition, a ground routing line for preventing static electricity from being introduced outside the touch sensing apparatus may be further formed outside the dummy routing line on the bezel area. Thus, the dummy routing line may be formed between the ground routing line and the outermost readout channel on the bezel area, thereby minimizing parasitic capacitance deviation of the outermost readout channel due to the ground routing line.

The touch controller 30 sequentially supplies driving pulses to scan lines of the touch sensor 20, acquires raw data indicating whether touch is present for each respective touch node (for each respective touch channel) using a readout signal output from a readout line of the touch sensor 20, detects a touch region using the raw data, and calculates coordinates of the detected touch region and provides the coordinates to the host computer 50.

In particular, the touch controller 30 may buffer a readout signal input from the outermost readout channel of the touch sensor 20 and supply the buffered readout signal to a dummy routing line adjacent to the outermost readout channel, thereby reducing parasitic capacitance deviation of the outermost readout channel.

The host computer 50 supplies image data and a plurality of synchronization signals to the timing controller 18, analyzes touch point coordinates input from the touch controller 30, and executes a command corresponding to the touch operation.

Figure 2:
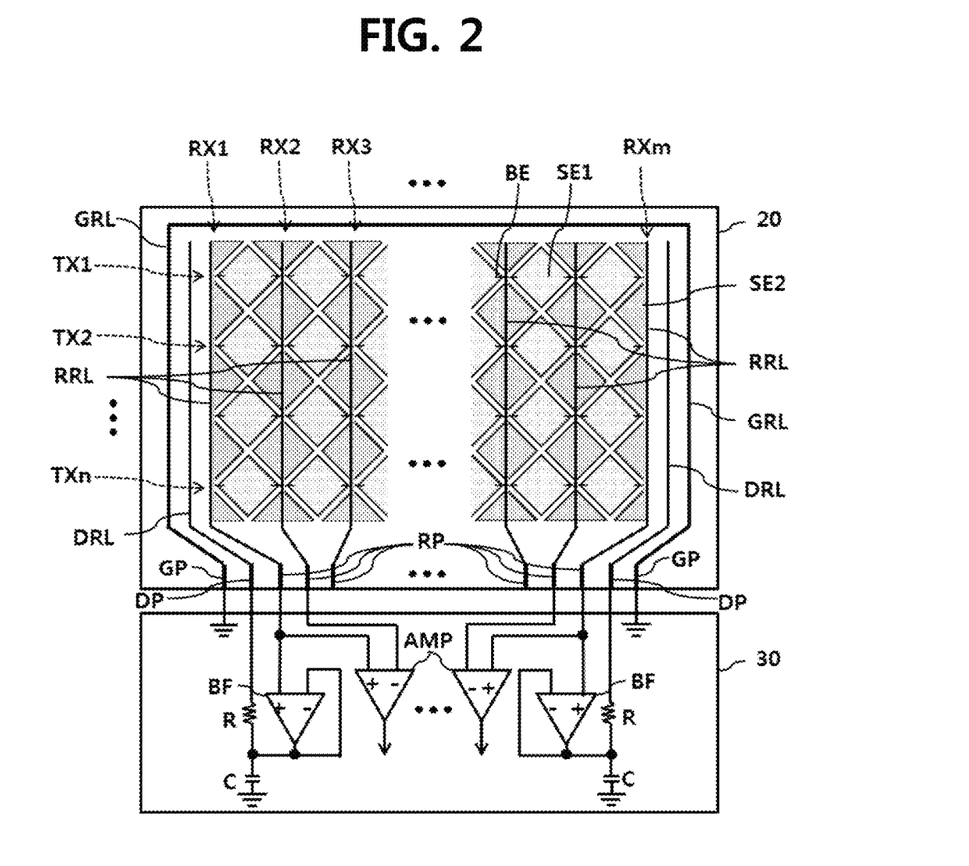
FIG. 2 is a schematic diagram illustrating the structure of a touch sensing apparatus according to an embodiment of the present invention.

FIG. 2 is a schematic diagram illustrating the structure of the capacitance touch sensing apparatus of FIG. 1 according to an embodiment of the present invention.

The capacitance touch sensing apparatus illustrated in FIG. 2 includes the touch sensor 20 and the touch controller 30.

The touch sensor 20 of capacitance type includes a plurality of scan channels TX1 to TXn configured by electrically connecting a plurality of first sensing electrodes SE1 arranged in a first direction (a horizontal direction, an X-axis direction), and a plurality of readout channels RX1 to RXm configured by electrically connecting a plurality of second sensing electrodes SE2 arranged in a second direction (a vertical direction, a Y-axis direction). The first and second sensing electrodes SE1 and SE2 may each be mainly shaped like a diamond, but may each be shaped like other various shapes such as a triangle, a quadrangle, a polygon, a circle, an oval, etc. The first sensing electrodes SE1 arranged in the first direction are electrically connected to each other through bridge electrodes BE. The second sensing electrodes SE2 arranged in the second direction may be connected to each other. In addition, the second sensing electrodes SE2 are also electrically connected to each other through a readout routing line RRL formed to overlap the second sensing electrodes SE2. In other words, each of the plural readout channels RX1 to RXm includes the readout routing line RRL that is connected to and overlaps the second sensing electrodes SE2 of the respective channels.

The touch sensor 20 includes a sensing area in which the first and second sensing electrodes SE1 and SE2 are arranged for sensing touch, and a bezel area (a non-sensing area) of an outer portion surrounding the sensing area. In the bezel area, various routing lines for connecting the plural scan channels TX1 to TXn and readout channels RX1 to RXm to the touch controller 30 and pads are formed.

For example, in the bezel area, scan routing lines (not shown) for electrically connecting the plural scan channels TX1 to TXn to first pads of the touch controller 30 and first pads (not shown) are formed. In addition, in the bezel area, second pads RP for electrically connecting the plural readout channels RX1 to RXm to second pads of the touch controller 30 are formed, and the readout routing line RRL extends from each of the plural readout channels RX1 to RXm through the bezel area and is electrically connected to the second pads RP.

In addition, in the bezel area, a ground routing line GRL for shutting static electricity from outside is formed in the form of a closed or open loop surrounding the sensing area, and a ground pad GP for connecting the ground routing line GRL to a ground is formed.

In particular, in the bezel area, respective dummy routing lines DRL are formed between the ground routing line GRL and the outermost readout channels RX1 and RXm, and a dummy pad DP for connecting the dummy routing line DRL to the touch controller 30 is formed. The dummy routing lines DRL is formed in parallel to the ground routing line GRL and the outermost readout routing line RRL between the ground routing line GRL and the outermost readout channels RX1 and RXm and is connected to the dummy pad DP.

Figure 3:
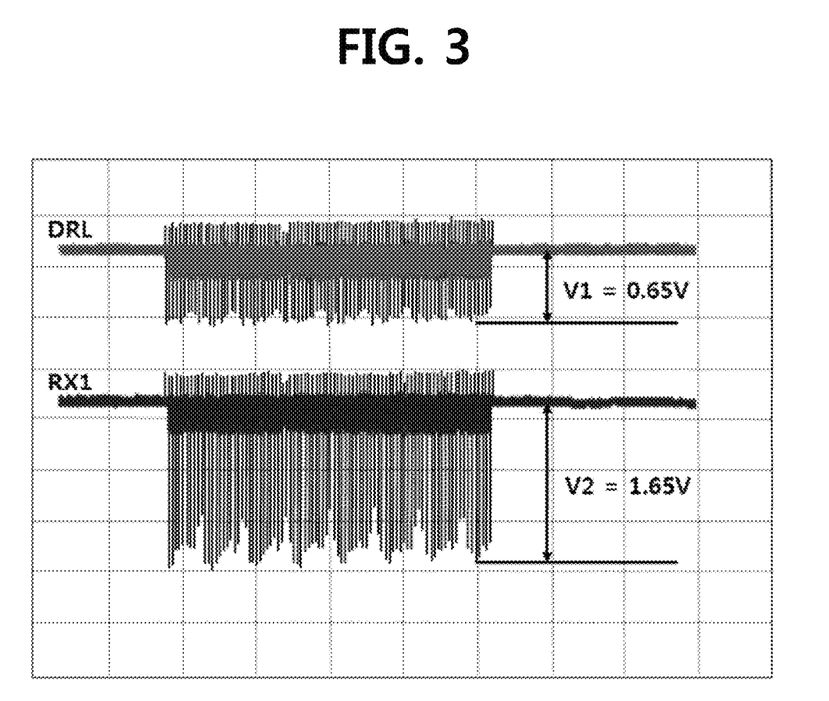
FIG. 3 is a diagram illustrating an example of a signal waveform supplied to an outermost readout channel and a dummy routing line illustrated in FIG. 2.

A readout signal from the outermost readout channels RX1 and RXm adjacent to the dummy routing line DRL is buffered by the touch controller 30 and is supplied to the dummy routing line DRL, and thus, a signal with the same phase as a readout signal of the outermost readout channels RX1 and RXm adjacent to the dummy routing line DRL may be supplied to the dummy routing line DRL, as illustrated in FIG. 3. As seen from FIG. 3, a signal with the same phase as a readout signal of the outermost readout channel RX1 is supplied to the dummy routing line DRL adjacent to the outermost readout channel RX1. However, an amplitude of the signal supplied to the dummy routing line DRL may be reduced compared with a readout signal on the outermost readout channel RX1 due to parasitic capacitance and parasitic resistance present in the dummy routing line DRL.

Thus, a deviation between parasitic capacitance of the outermost readout channels RX1 and RXm and parasitic capacitance of the other readout channels RX2, RXm-1, etc. is minimized by virtue of the dummy routing line DRL, thereby reducing noise of the outermost readout channels RX1 and RXm due to the parasitic capacitance deviation.

In addition, noise of the outermost readout channels RX1 and RXm may be reduced by virtue of the dummy routing line DRL, thereby reducing an interval between the ground routing line GRL for noise reduction and the outermost readout channels RX1 and RXm.

The plural scan channels TX1 to TXn are sequentially driven by the touch controller 30 such that the first and second sensing electrodes SE1 and SE2 form capacitance according to fringe field, form a capacitor with a conductive touch object that touches or approaches the touch sensor 20 to change the capacitance, and outputs a readout signal indicating the capacitance change to the touch controller 30 through the plural readout channels RX1 to RXm.

The touch controller 30 sequentially drives the scan channels TX1 to TXn of the touch sensor 20. Thus, in the touch sensor 20, the first and second sensing electrodes SE1 and SE2 form capacitance according to fringe field, forms a capacitor with a conductive touch object that touches or approaches the touch sensor 20 to change the capacitance, and outputs a readout signal indicating the capacitance change to the touch controller 30 through the plural readout channels RX1 to RXm.

The touch controller 30 senses readout signals of the readout channels RX1 to RXm when the scan channels TX1 to TXn of the touch sensor 20 are driven. The touch controller 30 compares readout signals of two adjacent channels to sense a readout channel in which the touch occurs. For example, the touch controller 30 may compare readout signals of two adjacent readout channels using differential amplifiers AMPs for differential amplification by receiving the readout signals of the two adjacent channels to sense a readout signal that varies according to capacitance variation.

In addition, the touch controller 30 converts the sense signal into digital data to output raw data, compares the raw data with a predetermined reference value to determine whether touch is present, detects a touch region, and detects touch coordinates corresponding to the detected touch region and supplies the touch coordinates to the host computer 50.

In addition, the touch controller 30 buffers outermost readout signals output from the outermost readout channels RX1 and RXm through a buffer BF and supplies the buffered signals to the dummy routing line DRL. The buffer BF inputs the outermost readout signals to a positive input terminal (+), and a negative input terminal (−) is connected to an output line of the buffer BF. Thus, the buffer BF buffers the input outermost readout signal and provides the outermost readout signal to the dummy routing line DRL. A parasitic capacitor C is connected between an output line of the buffer BF connected to the dummy routing line DRL and a ground and a parasitic resistor R is present in the output line of the buffer BF.

Figure 4A:
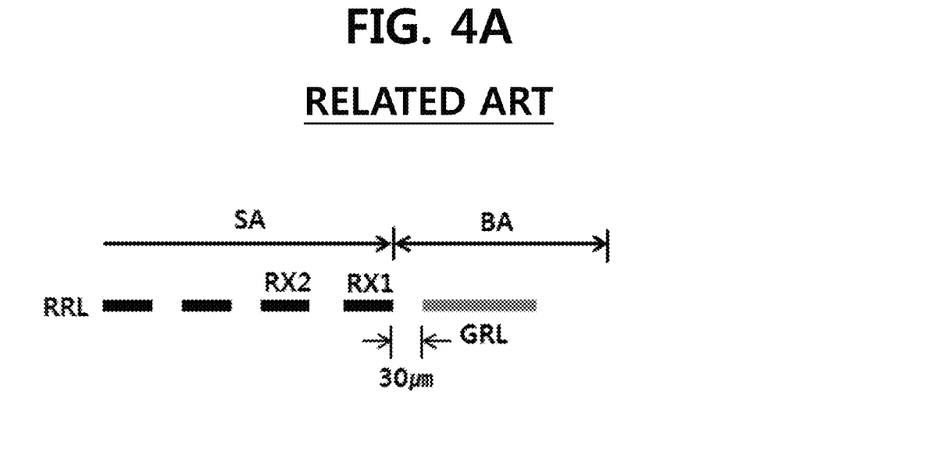
FIGS. 4A to 4C are diagrams illustrating comparison between widths of bezel areas of a touch sensing apparatus according to the related art (FIGS. 4A and 4B) and a touch sensing apparatus according to the present invention (FIG. 4C)
Figure 4B:
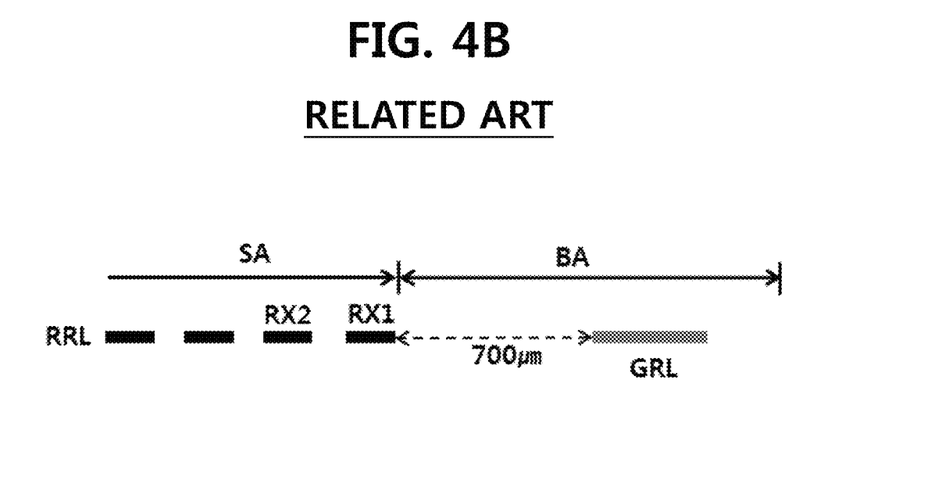
Figure 4C:
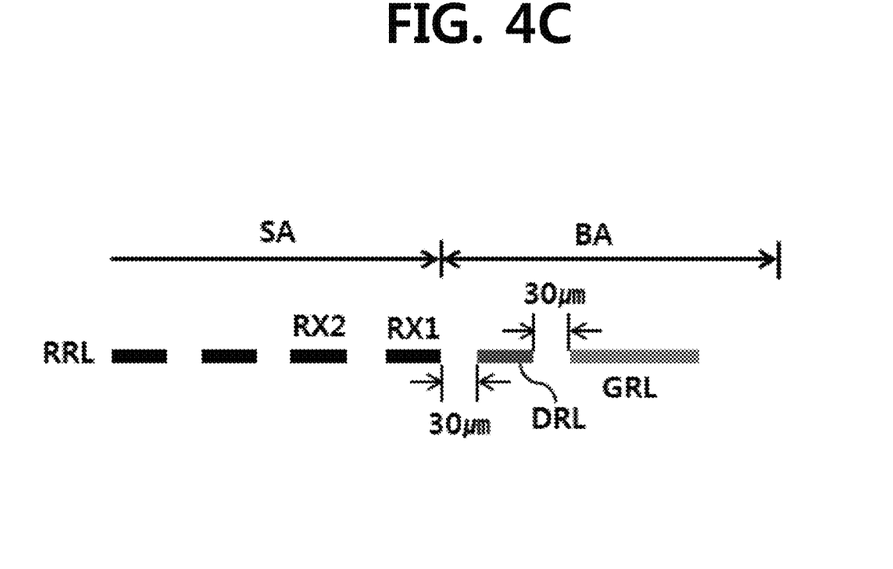

FIGS. 4A to 4C are diagrams illustrating comparison between widths of bezel areas of a touch sensing apparatus according to the related art and a touch sensing apparatus according to the present invention.

Referring to FIG. 4A, in the touch sensing apparatus according to the related art, when an interval between the ground routing line GRL of a bezel area BA and the outermost readout channel RX1, that is, the outermost readout routing line RRL of a sensing area SA is set to 30 μm, problems arise in that parasitic capacitance between the outermost readout routing line RRL and the ground routing line GRL is increased to increase noise component of the outermost readout channel RX1.

Referring to FIG. 4B, in the touch sensing apparatus according to the related art, when the interval between the ground routing line GRL of the bezel area BA and the outermost readout routing line RRL of a sensing area SA is increased and set to 700 μm, problems arise in that noise component of the outermost readout channel RX1 is reduced due to reduced parasitic capacitance but the width of a bezel area is increased.

Referring to FIG. 4C, in the touch sensing apparatus according to the present invention, when the dummy routing line DRL is added between the ground routing line GRL of the bezel area BA and the outermost readout routing line RRL of the sensing area SA, and an interval between the outermost readout routing line RRL and the dummy routing line DRL and an interval between the dummy routing line DRL and the ground routing line GRL are each set to 30 μm, parasitic capacitance deviation between the outermost readout channel RX1 and another readout channel is minimized due to the dummy routing line DRL to which a signal with the same phase as the outermost readout channel RX1 is supplied, thereby reducing noise components of the outermost readout channel RX1. Thus, an interval between the dummy routing line DRL and the ground routing line GRL may be set to 30 μm which is the same as an interval with another routing line without increase in an interval of the ground routing line GRL as in FIG. 4B, and thus, the width of the bezel area BA may be reduced as compared with the case of FIG. 4B.

Figure 5A:
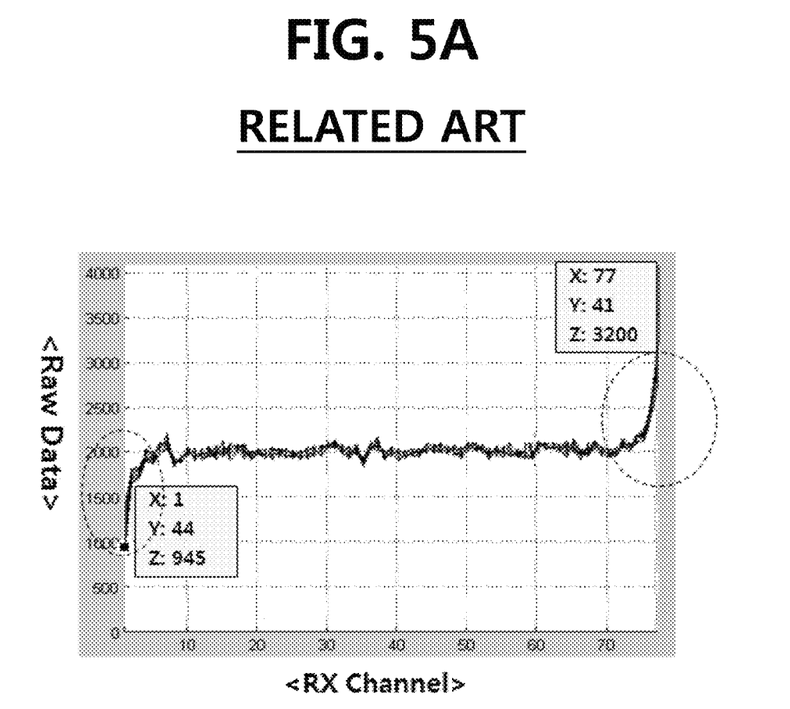
FIGS. 5A and 5B are diagrams respectively illustrating comparison between raw data about sensed readout channels in a touch sensing apparatus according to the related art and a touch sensing apparatus according to the present invention.
Figure 5B:
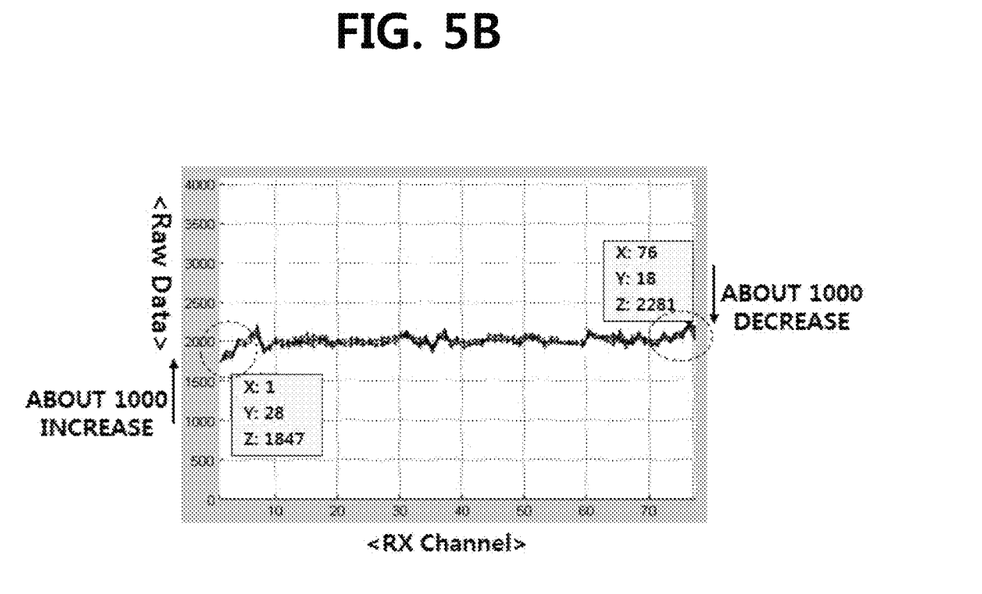

FIGS. 5A and 5B are diagrams illustrating comparison between raw data about sensed readout channels in a touch sensing apparatus according to the related art and a touch sensing apparatus according to the present invention.

As seen from FIG. 5A, as a result of measuring raw data using a readout signal output for each respective readout channel using the touch sensing apparatus according to the related art illustrated in FIG. 4A, a base level of raw data is decreased or increased compared with a base level of another readout channel by about 1000 levels due to noise component at an outermost readout channel adjacent to the ground routing line GRL. Thus, touch sensing capability at an outermost readout channel is reduced in the conventional touch sensing apparatus.

As seen from FIG. 5B, as a result of measuring raw data for each respective readout channel using the touch sensing apparatus according to the embodiment of the present invention illustrated in FIG. 4C, noise components at an outermost readout channel is reduced due to the dummy routing line DRL, and thus, a base level of the outermost readout channel is similar to a base level of another readout channel. Thus, touch sensing capability at an outermost readout channel is enhanced in the touch sensing apparatus according to the present invention.

As described above, the sensing apparatus and the method of driving the same according to the embodiments of the present invention may further add a dummy routing line connected to an outermost readout channel between the outermost readout channel and a ground routing line and to which a signal with the same phase as an outermost readout channel is supplied, thereby effectively reducing deviation of parasitic capacitances of the outermost readout channel due to the ground routing line and reducing noise components due to the deviation.

Thus, the sensing apparatus and the method of driving the same according to the embodiment of the present invention may reduce an interval between the ground routing line and the outermost readout channel compared with a conventional case in which an interval between an outermost readout channel and a ground routing line is increased to reduce noise so as to reduce the width of an external bezel area, thereby achieving a narrow bezel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch sensing apparatus, comprising:
   a plurality of readout channels arranged next to each other, each readout channel comprising at least one sensor electrode;
   a ground routing line arranged next to at least one outermost readout channel of the plurality of readout channels;
   at least one dummy routing line arranged between the ground routing line and the at least one outermost readout channel; and
   a touch controller configured to provide a signal through the at least one dummy routing line to at least reduce a noise caused by the at least one outermost readout channel.

2. The touch sensing apparatus of claim 1,
   wherein the at least one dummy routing line runs at least partially in parallel to the at least one outermost readout channel.

3. The touch sensing apparatus of claim 1,
   wherein the at least one dummy routing line comprises a first dummy routing line and a second dummy routing line;
   wherein the at least one outermost readout channel comprises a first outermost readout channel arranged on a first side of the plurality of readout channels and a second outermost readout channel arranged on a second side of the plurality of readout channels, wherein the second side is opposite the first side;
   wherein the first dummy routing line is arranged between the ground routing line and the first outermost readout channel; and
   wherein the second dummy routing line is arranged between the ground routing line and the second outermost readout channel.

4. The touch sensing apparatus of claim 1,
   wherein the touch controller is configured to provide the signal through the at least one dummy routing line, wherein the signal has the same phase as a readout signal of the outermost readout channel.

5. The touch sensing apparatus of claim 4,
   wherein the touch controller comprises a buffer circuit configured to provide the signal.

6. The touch sensing apparatus of claim 5,
   wherein the buffer circuit comprises at least one amplifier, wherein a non-inverting input of the amplifier is coupled to the outermost readout channel, and wherein an inverting input of the amplifier and an output of the amplifier are coupled to the dummy routing line.

7. The touch sensing apparatus of claim 5, the touch controller further comprising:
   a plurality of differential amplifiers, each differential amplifier comprising two inputs;
   wherein each of two adjacent readout channels of the plurality of readout channels is coupled to a respective input of the two inputs of an associated differential amplifier.

8. The touch sensing apparatus of claim 1, further comprising:
   a sensing region, wherein the plurality of readout channels are arranged within the sensing region; and
   a bezel region at least partially surrounding the sensing region, wherein the ground routing line and the at least one dummy routing line are arranged within the bezel region.

9. The touch sensing apparatus of claim 8, further comprising:
   a plurality of scan channels arranged next to each other, each scan channel comprising at least one sensor electrode;
   wherein the scan channels are arranged in a first direction;
   wherein the readout channels are arranged in a second direction perpendicular to the first direction;
   wherein at least one sensor electrode of a scan channel and an associated at least one sensor electrode of a readout channel form a capacitance according to a fringe field.

10. The touch sensing apparatus of claim 1,
    wherein the touch controller is configured to provide a signal through the at least one dummy routing line to at least reduce a parasitic capacitance deviation between the at least one outermost readout channel and other readout channels and/or to at least reduce a parasitic capacitance between the at least one outermost readout channel and the ground routing line.

11. A method of driving a touch sensing apparatus, the touch sensing apparatus comprising:
    a plurality of readout channels arranged next to each other, each readout channel comprising at least one sensor electrode;
    a ground routing line arranged next to at least one outermost readout channel of the plurality of readout channels; and
    at least one dummy routing line arranged between the ground routing line and the at least one outermost readout channel, the method comprising:
supplying a signal through the at least one dummy routing line to at least reduce a noise caused by the at least one outermost readout channel.

12. The method of claim 11, wherein the signal has the same phase as a readout signal of the outermost readout channel.

13. The method of claim 12, further comprising:
buffering a readout signal of the outermost readout channel; and
supplying the signal based on the buffered readout signal of the outermost readout channel.

\* \* \* \* \*